(12) United States Patent
Ruffa

(10) Patent No.: US 7,679,999 B2
(45) Date of Patent: Mar. 16, 2010

(54) MARINE ACOUSTIC SENSOR ASSEMBLY

(75) Inventor: Anthony A. Ruffa, Hope Valley, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 512 days.

(21) Appl. No.: 11/772,870

(22) Filed: Jul. 3, 2007

(65) Prior Publication Data

US 2009/0008184 A1    Jan. 8, 2009

(51) Int. Cl.
*G01H 9/00* (2006.01)
(52) U.S. Cl. ......................................... 367/149
(58) Field of Classification Search ............... 367/149; 385/12, 13
See application file for complete search history.

(56) References Cited

U.S. PATENT DOCUMENTS

| | | |
|---|---|---|
| 4,333,169 A | 6/1982 | Hoyt |
| 4,655,086 A | 4/1987 | Mielnicka-Pate et al. |
| 5,505,090 A | 4/1996 | Webster |
| 5,616,865 A | 4/1997 | Webster |
| 5,679,899 A | 10/1997 | Webster et al. |
| 6,349,791 B1 | 2/2002 | Glenning et al. |
| 2009/0008184 A1* | 1/2009 | Ruffa ........................ 181/140 |

OTHER PUBLICATIONS

Benjamin A. Cray, Stephen E. Forsythe, Andrew J. Hull, and Lee E. Estes, A Scanning Laser Doppler Vibrometer Acoustic Array, paper, Jul. 2006, pp. 164-170, vol. 120, No. 1, Acoustical Society of America, USA.

* cited by examiner

*Primary Examiner*—Dan Pihulic
(74) *Attorney, Agent, or Firm*—James M. Kasischke; Jean-Paul A. Nasser; Michael P. Stanley

(57) ABSTRACT

A marine acoustic sensor assembly includes an acoustic panel having a forward surface and an after surface, a laser scanner oriented so as to project a laser beam onto the acoustic panel after surface, and a sensor oriented so as to receive reflections of the laser beam off the acoustic panel and to transmit data from which a position of a sound generating source can be determined, wherein the acoustic panel is provided with an absorber layer extending over the after surface thereof, and the absorber layer is provided with holes extending therethrough, the holes being of a size sufficient to permit passage of the laser beams to the acoustic panel after surface and the reflections to pass to the sensor, whereby to minimize reflections and noise originating from aft of the after surface, while permitting sound incoming from forward of the acoustic panel to be measured.

15 Claims, 2 Drawing Sheets

MARINE ACOUSTIC SENSOR ASSEMBLY

STATEMENT OF GOVERNMENT INTEREST

The invention described herein may be manufactured and used by or for the Government of the United States of America for governmental purposes without the payment of any royalty thereon or therefore.

BACKGROUND OF THE INVENTION

1. Field of the Invention

The invention relates to target detection and tracking apparatus and is directed more particularly to an acoustic sensor assembly for detecting and tracking noise-producing and/or noise reflecting objects in an ocean environment.

2. Description of the Prior Art

Marine vessels, such as submarines and surface ships, are typically provided with acoustic sensor assemblies. In such assemblies a laser scanner is disposed and oriented so as to project a laser beam onto an after surface of an acoustic panel, the sensor being disposed and oriented so as to receive reflections of the laser beam off the acoustic panel and to transmit data from which a position of a sound generating source can be determined. An example of such an acoustic sensor assembly is shown and disclosed in U.S. Pat. No. 6,349,791.

Only the sound incident on a forward surface of the acoustic panel, that is, incoming sound from the water, is desired to be measured. The sound incident on the after side of the panel originates from inside the vessel (e.g. as a result of reflections) and is considered to be only "noise". Because the system cannot distinguish between incoming sound and noise, there is a need to diminish or eliminate internal reflections that are otherwise detected.

SUMMARY OF THE INVENTION

Accordingly, an object of the invention is to provide a marine acoustic sensor assembly which measures substantially only the sound incident on the forward surface of the acoustic panel, while greatly decreasing, or eliminating, sound incident on the after surface of the acoustic panel.

With the above and other objects in view, a feature of the present invention is the provision of a marine acoustic sensor assembly comprising an acoustic panel having a forward surface and an after surface, a laser scanner disposed proximate and removed from the acoustic panel after surface, the laser scanner being oriented so as to project a laser beam onto the acoustic panel after surface, and a sensor disposed and oriented so as to receive reflections of the laser beam off the acoustic panel and to transmit data from which a position of a sound generating source can be determined, wherein the acoustic panel is provided with an absorber layer extending over the after surface of the acoustic panel, and wherein the absorber layer is provided with holes extending therethrough, the holes being of a size sufficient to permit passage of the laser beams therethrough to the acoustic panel after surface and the reflections to pass therethrough and to the sensor, whereby to minimize reflections and noise originating from aft of the after surface, while permitting sound incoming from forward of the acoustic panel to be measured.

In accordance with a further feature of the invention, there is provided a bow dome acoustic sensor assembly including an outer hull portion, an inner pressure hull wall extending athwartship and in conjunction with the outer hull bow portion defining a free-flood compartment, an acoustic bow panel disposed in the compartment and connected to the pressure hull wall by acoustically isolating supports extending from the base panel to the pressure hull wall, a laser scanner disposed in the compartment and oriented so as to project a laser beam onto an after surface of the acoustic bow panel, the after surface of the acoustic bow panel having a sound absorber layer extending thereover, the absorber layer being provided with holes extending therethrough, the holes exposing portions of the after surface of the acoustic bow panel, and a sensor disposed in the compartment and oriented so as to receive reflections of the laser beam off the acoustic panel after surface exposed portions and to transmit data from which a position of a sound generating source can be determined.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, wherein corresponding reference characters indicate corresponding parts throughout the drawings and wherein.

DETAILED DESCRIPTION OF THE INVENTION

Figure 1:
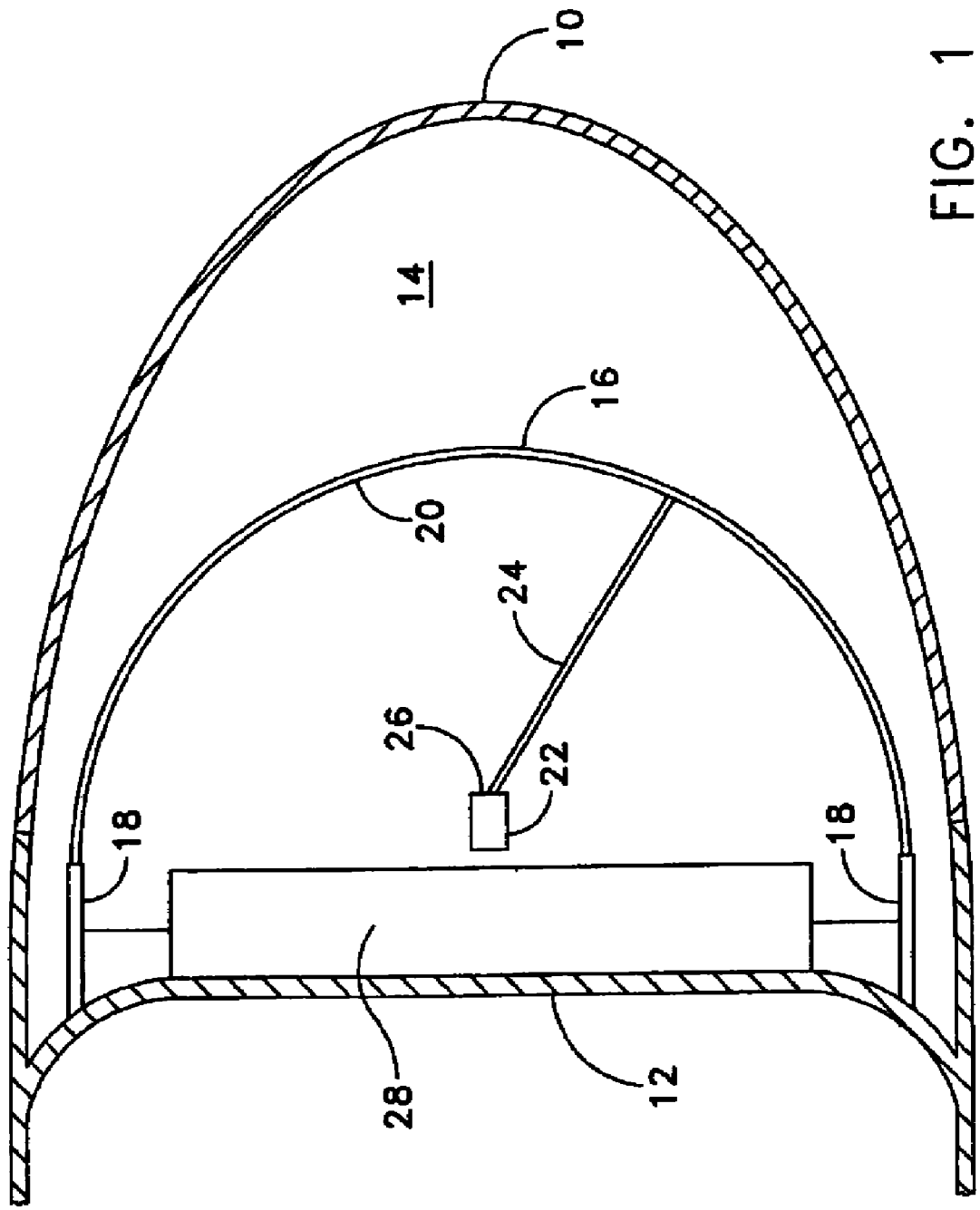
FIG. 1 is a diagrammatic top plan view of one form of prior art acoustic sensor assembly.

Referring to FIG. 1 it will be seen that a bow dome acoustic sensor assembly includes a forward-most outer hull portion 10 of the submarine or surface ship, known as the "bow dome". Proximate the base of bow dome 10 is a pressure hull portion 12 extending athwartships and, in conjunction with bow dome 10, defining a zone 14.

Disposed within the zone 14 is an acoustic panel 16 of lightweight rigid material, such as an aromatic polyamide material, or other relatively stiff plastic, or aluminum, or other material sufficiently rigid to be self supporting. The panel 16 is of a diameter such as to substantially fill the available space within the bow dome. The acoustic panel 16 is mounted on pressure hull portion 12 by way of acoustically isolating supports 18. An after surface 20 of the acoustic panel 16 is provided with optical properties which permit analysis of light from a laser, as is known in the art.

Further disposed within the zone 14 is a laser scanner 22 mounted in a vibrationally insulated manner. The laser scanner 22 is oriented to cast a laser beam 24 on the after surface 20 of the acoustic panel 16. Such laser scanners are known in the art and often referred to a vibrometers, which operate to move a laser beam rapidly over a surface. The surface 20 can be of any configuration and the beam 24 can be moved in any pattern.

A sensor 26 is provided and may be in the same housing as the scanner 22, as illustrated in the drawings. The sensor 26 receives reflections of the laser beam 24 off the acoustic panel surface 20. The velocity of the scanned sections of the acoustic panel 16, caused by impinging sound waves passing through the bow dome 10, can be determined by doppler shift of the reflected light received by the sensor 26. The aforementioned optical properties of the acoustic panel surface 20 cause reflection of the reflected laser beam for collection by the sensor 26. A plurality of laser scanners 22 can be used to increase the speed at which the entire acoustic panel surface 20 is scanned. The data relative to speed of acoustic wave induced vibration of the acoustic panel is transmitted from sensor 26 to an onboard computer (not shown) for calculation of location and direction and speed of movement of a noise-producing object in the ocean environment.

The assembly as described above is capable of "passive" detection, that is, receiving and analyzing noises from the ocean environment.

The assembly is provided with an acoustic sources array 28 to facilitate operations of an "active" detection character. The acoustic sources 28 may be "pingers", or the like, for sending forth sound waves which are reflected by objects in the water back to the acoustic panel 16. Thus, the assembly provides for both passive and active modes of operation.

In operation, zone 14 is flooded with sea water in which the acoustic panel 16 and other components of the assembly are submerged. Through either active or passive operation, sound waves pass through the outer hull 10 and impinge upon the acoustic panel 16, inducing vibrations in the panel 16. The laser scanner 22 scans surface 20 with laser beam 24 to obtain reflections at sensor 26. Frequency changes of the received reflections provide velocities on the surface 20 for computer analysis to obtain the position, course and speed of a noise generating or reflecting object.

Figure 2:
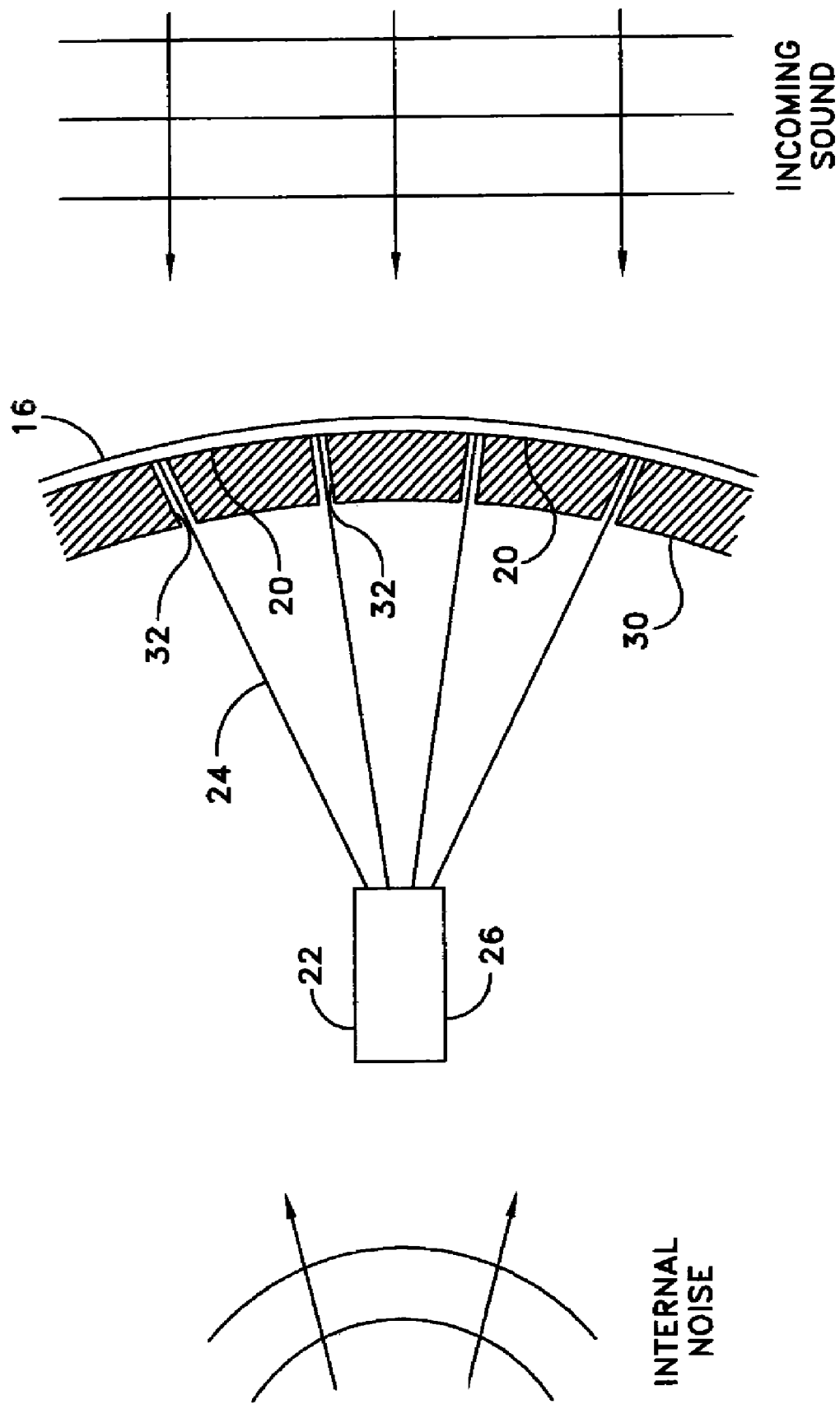
FIG. 2 is a diagrammatic top plan view of an acoustic sensor assembly illustrative of an embodiment of the invention.

Referring to FIG. 2, it will be seen that in accordance with the invention, the after surface 20 of the acoustic panel 16 is provided with a layer 30 of sound-absorbing material which prevents most of the aforementioned interior "noise" from reaching the after surface 20 of the acoustic panel 16. The layer 30 is provided with holes 32 extending therethrough to the acoustic panel after surface 20. The holes 32 are of sufficient size for laser beams 24 to pass through, but are very small compared to an acoustic wavelength, so that the absorber operation is not significantly compromised. For example, each hole 32 may be on the order of one millimeter diameter, which permits laser detection, but will allow very little unwanted acoustic energy to be reflected back to the sensor 26. The hole diameter preferably is less than one millimeter for ultrasonic applications having smaller wavelengths.

There is thus provided an acoustic sensor assembly wherein a layer of absorbent material blocks reflection of internal noises which would otherwise be detected, along with the externally originated target sound.

Each hole 32 forms the center of a virtual hydrophone. A single laser may scan each virtual hydrophone center on the entire dome surface, or multiple lasers may be used to scan smaller numbers of virtual hydrophone centers. In either system, the absorber layer 30 serves to block internal reflections which otherwise would be detected by the virtual hydrophones.

There is thus provided a marine acoustic sensor assembly which is operative to minimize reflections and noise originating from inside the vessel in which the assembly is mounted, while permitting sound incoming from an ocean environment to be detected and measured.

There is further provided a bow dome acoustic sensor assembly adapted to detect and measure sound incoming from the surrounding ocean environment, while minimizing the influence of internally-generated "noise" and the effects it might have on target detection.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A marine acoustic sensor assembly comprising:
   an acoustic panel having a forward surface and an after surface;
   a laser scanner disposed proximate and removed from the acoustic panel after surface, said laser scanner being oriented so as to project a laser beam onto the acoustic panel after surface;
   a sensor disposed and oriented so as to receive reflections of the laser beam off said acoustic panel and to transmit data from which a position of a sound generating source can be determined;
   wherein said acoustic panel is provided with a sound absorber layer extending over the after surface of said acoustic panel;
   wherein said sound absorber layer is provided with holes extending therethrough, the holes being of a size sufficient to permit passage of the laser beams therethrough to the acoustic panel after surface and the reflections to pass therethrough and to said sensor, the holes being of a size that is small relative to a wavelength of an acoustic wave that originates from the sound generating source; and
   whereby to minimize reflections and noise originating from aft of the after surface, while permitting sound incoming from forward of said acoustic panel to be measured.

2. The assembly in accordance with claim 1 and further comprising an acoustic source for generating and sending acoustic signals outwardly from said assembly.

3. The assembly in accordance with claim 1 wherein said acoustic panel comprises a generally hemispherically-shaped panel forming an after-facing concavity.

4. The assembly in accordance with claim 1 wherein said acoustic panel comprises a generally cylindrically-shaped panel forming an after-facing concavity.

5. The assembly in accordance with claim 1 wherein said laser scanner is a vibrometer having a laser beam which moves rapidly over the after surface of said acoustic panel.

6. A submarine bow dome acoustic sensor assembly comprising:
   an outer hull bow portion;
   an inner pressure hull wall extending athwartships and in conjunction with said outer hull bow portion defining a compartment, wherein a portion of said compartment can be flooded with water;
   an acoustic bow panel having a forward surface and an after surface, disposed in said compartment and connected to said inner pressure hull wall by acoustically isolating supports extending from said inner pressure hull wall;
   a laser scanner disposed in said compartment and oriented so as to project a laser beam onto the after surface of said acoustic bow panel;
   a sound absorber layer disposed and extending over the after surface of said acoustic bow panel, the absorber layer having holes extending therethrough, the holes exposing portions of the after surface of said acoustic bow panel, the holes being of a size sufficient to permit passage of the laser beam, the holes being of a size that is small relative to a wavelength of an acoustic wave that originates from a sound generating source; and a sensor disposed in said compartment and oriented so as to receive reflections of the laser beam off the exposed portions of the after surface of the acoustic bow panel and to transmit data from which a position of a sound generating source can be determined.

7. The assembly in accordance with claim 6 and further comprising an acoustic source mounted in the compartment and on a forward side of said inner pressure hull wall for generating and sending acoustic signals outwardly from said assembly.

8. The assembly in accordance with claim 6 wherein said acoustic bow panel comprises a substantially hemispherically-shaped panel forming an after-facing concavity.

9. The assembly in accordance with claim 6 wherein said acoustic bow panel comprises a substantially cylindrically-shaped panel forming an after-facing concavity.

10. The assembly in accordance with claim 6 wherein said laser scanner is a vibrometer having a laser beam which moves rapidly over the exposed portions of the after surface of the acoustic bow panel.

11. A surface ship bow dome acoustic sensor assembly comprising:

an outer hull bow portion;

an inner pressure hull wall extending athwartships and in conjunction with said outer hull bow portion defining a compartment, wherein a portion of said compartment can be flooded with water;

an acoustic bow panel having a forward surface and an after surface, disposed in said compartment and connected to said inner pressure hull wall by acoustically isolating supports extending from said inner pressure hull wall;

a laser scanner disposed in said compartment and oriented so as to project a laser beam onto the after surface of said acoustic bow panel;

a sound absorber layer disposed and extending over the after surface of said acoustic bow panel, the absorber layer having holes extending therethrough, the holes exposing portions of the after surface of said acoustic bow panel, the holes being of a size sufficient to permit passage of the laser beam, the holes being of a size that is small relative to a wavelength of an acoustic wave that originates from a sound generating source; and a sensor disposed in said compartment and oriented so as to receive reflections of the laser beam off the exposed portions of the after surface of the acoustic bow panel and to transmit data from which a position of a sound generating source can be determined.

12. The assembly in accordance with claim 11 and further comprising an acoustic source mounted in the compartment and on a forward side of said inner pressure hull wall for generating and sending acoustic signals outwardly from said assembly.

13. The assembly in accordance with claim 11 wherein said acoustic bow panel comprises a substantially hemispherically-shaped panel forming an after-facing concavity.

14. The assembly in accordance with claim 11 wherein said acoustic bow panel comprises a substantially cylindrically-shaped panel forming an after-facing concavity.

15. The assembly in accordance with claim 11 wherein said laser scanner is a vibrometer having a laser beam which moves rapidly over the exposed portions of the after surface of the acoustic bow panel.

* * * * *